May 8, 1962     J. B. THOMSON     3,033,623
FLUOROCARBON SLEEVE BEARING
Filed Sept. 2, 1958
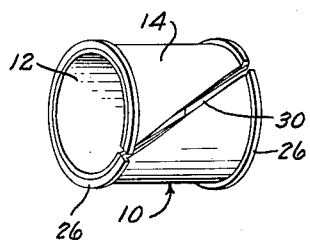
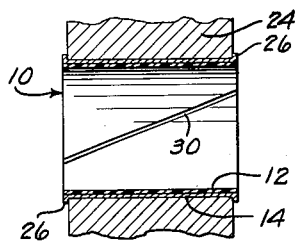
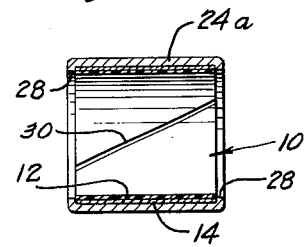
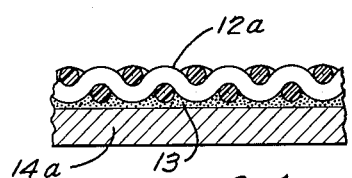
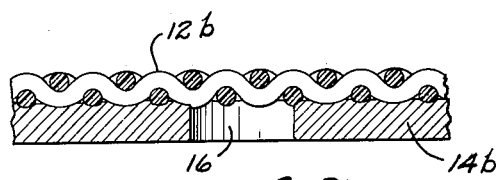
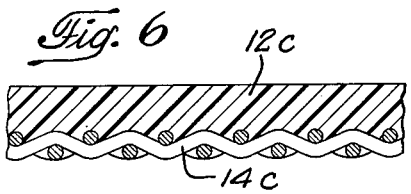
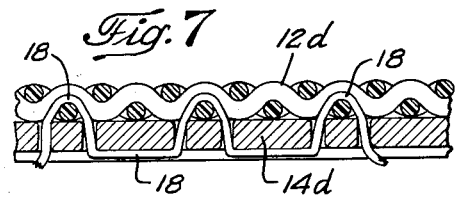
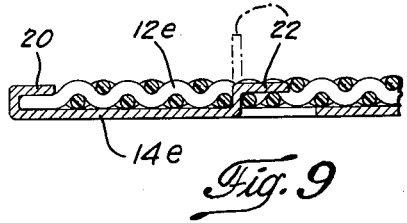
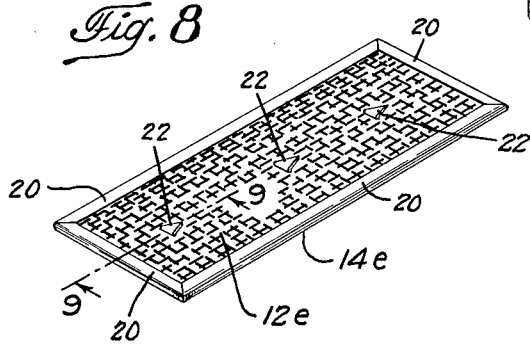
INVENTOR.
JOHN B. THOMSON
BY
Morgan, Finnegan, Durham & Pine
ATTORNEYS.

United States Patent Office 3,033,623
Patented May 8, 1962

3,033,623
FLUOROCARBON SLEEVE BEARING
John B. Thomson, 1029 Plandome Road, Manhasset, N.Y.
Filed Sept. 2, 1958, Ser. No. 758,215
6 Claims. (Cl. 308—238)

This invention relates to sleeve-type bearings for rotary and/or reciprocating shafts and has particular relation to such a bearing employing a wear resistant plastic bearing material having a low coefficient of friction but having limited structural strength because it is a fabric or because of low physical properties. Materials such as fluorocarbon resins have excellent bearing characteristics but heretofore they have been impractical for use in bearings.

Heretofore bearings with a fluorocarbon surface were made by bonding the fluorocarbon to the inside of a solid cylindrical sleeve. These bearings were then press fitted into a housing bore. A great disadvantage of this type is the fact that the force of the press fit reduces the bearing bore by an unpredictable amount. Bronze bearings are reamed to size them after press fitting. Since this cannot be done to the fluorocarbon surface, bearings of this type are not suitable where close fits are required. Moreover, bearings of this type are difficult to manufacture and consequently expensive as it requires complicated procedures to bond a material with heat and pressure on the inside surface of a cylinder.

There have been unsuccessful attempts to make a practical bearing of this type by bonding the bearing material to a sheet of heavy gauge metal and subsequently forming it into a rigid cylinder with abutted edges. While this solves the problem of bonding on the inside of the cylinder, a new and more serious problem was created. It is virtually impossible to roll up a sheet to form a cylinder that is perfectly round. This creates high spots on the inside diameter which cause areas of severe load concentration. Early failure of the bearing material at these points immediately causes failure of the whole bearing. This approach to solving the problem has consequently been impracticable.

The present invention solves these serious problems and provides a low cost precision bearing, that does not require press fitting or sizing after installation. Due to the radial flexibility of the liner element it will conform exactly to its mating housing bore which can easily and economically be bored or reamed to an exact diameter.

Objects and advantages of the invention will be obvious herefrom, or may be learned by practice with the invention, the same being realized and attained by means of the instrumentalities and combinations pointed out in the appended claims.

An object of the present invention is the provision of a novel and improved sleeve bearing which has a readily replaceable liner, the liner being of laminated construction which provides a friction or bearing surface of a wear resistant synthetic plastic, such as a fluorocarbon resin, preferably a highly oriented fluorocarbon fiber, in the form of a mass, such as a woven fabric. Another object is to provide in such a bearing a readily replaceable sleeve which avoids wrinkling or bunching of the liner during opertaion. Another object is to provide in such a bearing a laminated liner which may be manufactured at a high production rate utilizing high speed automatic machinery greatly reducing the cost of the bearing. A still further object is to provide in such a bearing a liner which maintains an extremely close diameter tolerance in that it is not to any great extent subject to dimensional changes resulting from temperature variations. Still another object is to provide such a bearing wherein the liner has excellent heat dissipation through the medium of its intimately contacted backing member.

In accordance with the present invention the bearing is provided with a housing or body that has a bore within which is disposed a readily removable sleeve of substantially uniform thickness over its bearing area. This sleeve is of laminated construction and is provided with a surface of a wear resistant synthetic plastic having a low coefficient of friction preferably woven or other mass of fibrous polytetrafluoroethylene. This wear resistant synthetic plastic forms a thin layer, and is firmly anchored to a circumferentially rigid metallic supporting layer or sheet which is sufficiently radially flexible so that the bearing bore diameter and roundness are governed by the diameter and shape of the housing bore. This metallic backing for the wear resistant synthetic plastic having a low coefficient of friction is of such a thickness that it is circumferentially rigid when formed into a cylinder and disposed in the bore of the housing so that assurance is had that neither portion of the laminated liner will wrinkle or bunch in a circumferential direction during operation or be otherwise transformed when enclosed between the shaft and the housing. This metallic backing is sufficiently flexible that it accurately conforms to the surface of the bore in the housing thereby assuring good heat dissipation from the wear resistant synthetic friction surface and also obtaining the accurate dimensioning of the housing bore.

The wear resistant synthetic plastic is firmly secured to the metallic backing member against circumferential displacement, and in accordance with the invention this may be bonded to the backing member or may be mechanically secured to the backing member at a large number of points over their adjacent surfaces. This liner may be formed from coil stock with the rear resistant synthetic plastic being readily secured to the metallic backing when in a flat strip and this laminated construction then rolled into the desired cylindrical shape. The sleeve preferably has a helical slot extending throughout its length that is formed by the spaced ends of the blank that has been rolled up to form the sleeve. This slot serves to permit circumferential expansion of the liner under its various operating conditions and also provides a grit trap and a lubricant reservoir. The liner may be formed with or without radial flanges at both or either of its ends for the purpose of providing a thrust bearing surface as well as for retaining the liner in the housing.

While it is preferred to make the liner friction surface or facing from a highly oriented polytetrafluoroethylene fiber such as "Teflon" fiber, nylon or other fluorocarbon fibers such as monochlorotrifluoroethylene may be employed, the invention comprising generically the fluorocarbon resins. Also, while a metal backing member is preferred, other flexible materials having the required strength may be used.

The invention consists in the novel parts, constructions, arrangements, combinations and improvements herein shown and described.

The accompanying drawings, referred to herein and constituting a part hereof, illustrate various embodiments of the invention and together with the description, serve to explain the principles of the invention.

FIGURE 1 is a perspective view of a laminated liner of this invention shown rolled into cylindrical form for insertion into a bearing housing;

FIGURE 2 is a longitudinal sectional view of the bearing of this invention showing the disposition of the laminated liner in the bearing housing;

FIGURE 3 is a similar longitudinal sectional view of a modified form of a bearing liner of the present invention;

FIGURE 4 is a fragmentary detailed cross-sectional view of a laminated bearing liner, in accordance with the present invention, and showing the preferred form thereof;

FIGURE 5 is a similar view showing a modified form of the liner of the present invention;

FIGURES 6 and 7 are other similar views showing further modifications of liners in accordance with the present invention;

FIGURE 8 is a general perspective view of a further modification of a liner of the present invention; and FIGURE 9 is a sectional view on the line 9—9 of FIGURE 8.

Referring now to the drawings, wherein like reference characters are used throughout to designate like elements, the preferred and illustrative embodiment of the invention shown in FIGURES 1 to 4, includes a laminated bearing liner 10 that is comprised of a woven layer or felted mass of fibrous fluorocarbon resin 12 usually in the form of a thin flexible fabric of substantially uniform, overall thickness, which is positioned over and secured to metallic backing sheet-like member 14.

The inner, thin, fibrous fluorocarbon resin surface 12 may be secured to the backing member or exterior metallic liner member 14 in various manners so that substantial, circumferential displacement of the layer 12 is prevented with respect to the metal layer 14, especially while the bearing liner is in use.

As presently preferred, and as shown in detail in FIGURE 4, the fluorocarbon resin layer 12a is adhesively bonded, as at 13, to the adjacent surface of the metal liner layer 14a by conventional or known bonding processes, such as those processes in which metallic sodium and naphthalene in a suitable solvent or metallic sodium in anhydrous liquid ammonia are used as treating materials with which the fluorocarbon is treated followed by a cementing operation.

Alternatively, and as shown schematically in FIGURES 5, 6, 7, 8 and 9 the fluorocarbon liner layer may be effectively secured to the metallic backing layer by means other than adhesive bonding.

Where mechanical fastening arrangements are used, as in FIGURES 5 to 9, the preferred, fibrous woven fluorocarbon layer which necessarily has an uneven surface may be crushed or firmly forced into the backing member sufficiently so as to emboss the backing member complementarily with this fluorocarbon layer and thereby inhibit relative movement between the two. For this purpose the metallic backing layer may be a sheet of thin, relatively soft flexible metal 14b, such as an aluminum alloy or soft aluminum, into which a woven layer of flexible fabric 12b, formed of fibrous fluorocarbon, is powerfully pressed, both to indent the face of the flexible metal sheet 14b, as well as to bring the overall thickness of the fabric 12b and the metal backing to the desirably precise uniform overall thickness best adapted for the bearing liner.

FIGURE 5 shows the backing member, identified as 14b, embossed complementarily with the resinous fluorocarbon layer 12b by the application of deforming pressure to the assembly thereby causing them to intermesh and substantially hold them against shifting. It will be understood that this may be used in combination with others of the disclosed mechanical means for securing the fluorocarbon layer to the backing member and that embossing by itself is not always sufficient to firmly secure this layer to the backing member.

Still more positive mechanical bonding of the fibrous fluorocarbon layer 12b to the backing sheet 14b may be obtained by having the metal backing sheet 14b formed of open mesh wire screening or of perforated metal, with the perforations 16 more or less uniformly distributed throughout the area of the backing sheet 14b. The resinous fluorocarbon layer 12b is forced into these openings 16 so that the layer is embedded in and immobilized with respect to the backing layer 14b. The pressure applied to embed the layer 12b in the backing layer 14b is preferably great enough to substantially deform the fibrous layer 12b and often the backing layer 14b, at the same time that the overall thickness of the layers is brought to the desired gauge thickness by this application of pressure.

Although it is preferable to use a bearing surface formed of fibrous polytetrafluoroethylene, many of the advantages of the invention can be obtained by the use of a compact, non-fibrous mass of a fluorocarbon resin supported on a flexible, circumferentially rigid metallic backing, such as a metallic screen or a perforated metal plate to which the fluorocarbon is applied and bonded, as by spraying one face of the metal screen or foraminated plate. As embodied in the form shown in FIGURE 6, a wire screen 14c of aluminum or bronze is provided and one side of this screen is sprayed with layer 12c of a fluorocarbon resin. The fluorocarbon, being forced into the apertures of the screen forms a firm mechanical lock between the resin layer and the screen. As the spray is continued, the particles adhere to each other, providing a continuous layer 12c of the resin on the screen. Thereafter, the resinous layer 12c and the metal screen 14c are subjected to powerful pressure so as to bring them to the desired thickness, even more firmly embedding the resin layer 12c into the screen. This stock material may then be cut into strips of the desired size to form the bearing liners of the present invention.

While various metals may be used for the screen or perforated metal plate 14c, the metal will preferably be one which is flexible, somewhat resilient, and which can be bent to the desired cylindrical form, being circumferentially rigid so that wrinkling of the liner is avoided in normal use.

FIGURE 7 shows another manner of mechanically securing the fluorocarbon resin to the backing member. In this embodiment the fluorocarbon layer 12d is secured to the metal backing sheet 14d by sewing, with the thread here being represented as 18 and as shown in FIGURE 7 being alternately passed through the backing sheet 14d and the fluorocarbon layer 12d.

After stitching, the laminated bearing liner material may be pressed to make it of uniform thickness, and it may then be cut into pieces of the desired size to form bearing liners.

FIGURES 8 and 9 illustrate a further modified embodiment of the invention in which a layer of fibrous fluorocarbon fabric 12e is secured to a backing member of thin metal 14e by tightly crimping the narrow edges 20 of the backing sheet over the fabric layer 12e and also by providing thongs 22 which are intermediate the edges 20 of the metal backing sheet 14e and which with its laminated bearing face is formed into a cylinder as shown in FIGURES 1 and 2 or FIGURE 3 and is positioned within the cylindrical bore or recesses provided in housing 24 or 24a with the radial lips 26 or 28 at each end of the liner or housing preventing axial movement of the liner within the housing.

As disposed in housing 24 the ends of the bearing liner are in spaced relation and form a small helical gap 30 when the liner is at its maximum operating temperature. This gap is of relatively small dimension and is only slightly greater than that necessary to provide for the maximum thermal expansion that the liner will have, whereby a small groove or gap is preferably provided into which particles of grit may be trapped and which provides an adequate reservoir for a fluid lubricant if that is desirable for operation of the bearing. The ends of the liner 10 which form gap 30 are parallel and disposed so that the gap is preferably helical rather than parallel with the axis of the housing 24 whereby a substantial and generally uniform bearing support is provided throughout the circumference of the bearing regardless of whether or not the bearing should rotate during its operation.

In order to insure that the liner 10 will not wrinkle or bunch up between the housing 24 and the shaft about which it is disposed during operation, the backing sheet 14 is sufficiently thick so as to have the required circumferential rigidity and stiffness to prevent this happening. At the same time, this backing sheet is sufficiently flexible and resilient that it will conform accurately to the inner wall of the bore of housing 24 and may be readily rolled into cylindrical form from a flat blank. The fluorocarbon layer 12 has very little stiffness itself and but for backing sheet 14 this layer would tend to circumferentially wrinkle between the shaft and the housing during operation.

In the bearing liner, as shown in FIGURES 8 and 9, the backing sheet 14e is first provided or formed in the shape of a flat parallelogram blank with thongs 22 extending upwardly. The fibrous fluorocarbon resin is then placed against the surface of the backing sheet 14e from which the thongs project and the edges 20 of this backing strip are crimped over to firmly secure the edges of the fluorocarbon resin layer to it, and the thongs are bent down as shown in FIGURE 9. The crimped edges and the thongs lie below the outer surface of the fluorocarbon layer so that assurance is had that they will not contact the shaft during operation of the bearing.

The laminated bearing liner 10 is formed into a cylinder with its fluorocarbon layer 12 on the interior of the cylinder to contact with an support a shaft relatively movable in the bearing liner. Means are provided to prevent axial displacement of the bearing liner 10 in its supporting housing 24, while permitting the liner to have at least some circumferential movement in the housing. For this purpose the ends of the bearing liner 10 may be outwardly flared, as at 26 as shown in FIGURES 1 and 2, or inturned lips 28 may be formed at the ends of the housing 24a preferably integral therewith.

The supporting housing 24 or 24a is formed with a cylindrical bore which receives the bearing liner 10 and is of such an internal diameter that when the bearing liner 10 is seated therein, the internal diameter of the liner 10 will accommodate the shaft with only a small running clearance.

The blank or flat laminated member may then be rolled into the generally cylindrical form as shown in FIGURE 1 with the outside diameter of this cylinder being somewhat greater than the inside diameter or recess of housing 24 in FIGURE 2. The backing sheet 14e is sufficiently resilient so that this now cylindrical bearing liner 10 may be sufficiently contracted so that the sleeve may be inserted into housing 24. After insertion into the housing the sleeve is released and accordingly resiliently engages the wall of the housing bore with the helical gap 30 being present. The liner is sufficiently resilient so that it can be expanded and transversely slipped over the shaft with which it is to cooperate and to journal making it very simple and economical to replace.

It will be appreciated that the housing 24 or 24a may be a removable portion of a bearing housing or may be a fixed part of a bearing journal.

The bearings may be made economically, and very close tolerances may be had as excellent operating characteristics are achieved. Close tolerance is possible because the thickness of the liner can be accurately controlled by running it through rolls to accurately size it when it is in the form of a flat blank, and is extremely desirable in a large number of applications where such a bearing is advantageous, as for example in electric motors, gear trains and precision control systems. Furthermore because of the flexibility of the liner and its split construction it accurately conforms to the size of the bore or recess in the housing and it is a simple matter to obtain an accurate housing bore within which the liner is retained.

The bearing has excellent operating characteristics since it has good heat dissipation and is affected little by temperature variations. Heat is rapidly conducted from the friction surface of fluorocarbon resin through the backing sheet which has a high heat conductivity and which is metal as hereinbefore mentioned, with this high heat dissipation effect permitting the bearing to operate at high speeds and greater loading. Since both the fluorocarbon layer 12 and the backing sheet 14 are relatively thin the amount of expansion of thickness of these members due to temperature changes in operation is so small as to be negligible and the split construction of the bearing liner permits it to expand and contract circumferentially without having any substantial effect upon the fit or operation of the bearing. This split construction also permits the bearing liner to be easily inserted into and removed from the bearing housing and slipped over the shaft.

The bearings of the present invention are highly advantageous with respect to previously known bearings of wear resistant synthetic plastic, due to the minimal quantity of the relatively expensive fluorocarbon resin required by the present invention, and also due to the circumferential rigidity of the bearing liners which prevents wrinkling of the wear resistant synthetic plastic layer.

Thus the structures of the present invention not only tend to eliminate many of the causes of incipient bearing failure, but also economize in the use of expensive material.

The invention further provides a simple and practical solution to the problem of achieving practical utilization of the highly advantageous properties of fibrous polytetrafluoroethylene and other fluorocarbon resins as a bearing surface, a problem which has not heretofore been solved in a practical manner. Thus it is now practical to use fibrous fluorocarbon resins, especially polytetrafluoroethylene, as a bearing liner, with their advantageously low coefficient of friction, and their relatively high PV (pressure-velocity) rating, in spite of the extremely high cost of the fluorocarbon resin.

While the fluorocarbon layer may be secured to the backing sheet in a number of different ways and may be either mechanically secured or bonded, the resulting laminated structure provides a highly satisfactory bearing that has the features of being economical and rapidly produceable as well as readily replaceable and providing long life and precision accuracy. The particular means for fastening the fluorocarbon layer to be backing sheet to be used depend upon a number of features including the particular use characteristics, such as loading, speed, reciprocation and/or rotation of the shaft as well as economic consideration. Also the thickness of both of the liner laminations are selected to give the desired radial flexibility and circumferential rigidity so that good conformability and the required torsional resistance are obtained.

The invention in its broader aspects is not limited to the specific mechanism shown and described but departures may be made therefrom, within the scope of the accompanying claims, without departing from the principles of the invention and without sacrificing its chief advantages.

What is claimed is:

1. A cylindrical bearing liner to be fitted within a support having an interiorly hollow cylindrical bore comprising a thin, flexible, laminated strip curved to bring its ends into close adjacency to each other to provide a narrow slot which permits the liner to be installed or replaced by axial movement into and out of position within the support, said slot and the radial flexibility of the liner allowing said liner to adjust itself closely to the interior diameter of said bore, said liner being of substantially greater circumference than wall thickness and being formed of a thin resilient exterior member and a thin interior layer of a wear resistant synthetic plastic having good low friction properties, said thin exterior and interior layers being attached to each other over their adjacent surfaces to prevent substantial relative movement, one with respect to the other, and said exterior member being free to move circumferentially of the bore into substantial overall contact with the contiguous interior surface of said cylindrical bore under normal operating loads.

2. A cylindrical bearing as claimed in claim 1 in which the interior layer is formed of a mass of fibrous polytetrafluoroethylene.

3. A cylindrical bearing as claimed in claim 1 in which the interior layer is formed of a woven mass of fibrous polytetrafluoroethylene, and the exterior liner member and the interior liner member are mechanically held to each other over their adjacent surfaces to prevent relative displacement of them during use.

4. A bearing liner adapted to be received within a passage formed in an outer housing, said liner comprising a split, generally cylindrical laminate of a substantially greater circumference than wall thickness, said laminate being circumferentially movable within said passage and including a thin flexible outer backing member and a thin flexible inner bearing surface of wear-resistant synthetic plastic having a low coefficient of friction securely attached to the backing member, said backing member being operative to impart sufficient circumferential rigidity to resist torque and prevent wrinkling during operation, said laminate having sufficient radial flexibility that, under normal operating loads, said laminate is conformed to and brought into over-all contact with the portions of said housing defining said passage.

5. The bearing as defined in claim 4 wherein said synthetic plastic is polytetrafluoroethylene.

6. The bearing as defined in claim 4 wherein said inner bearing surface is a mass of fibrous polytetrafluoroethylene.

References Cited in the file of this patent

UNITED STATES PATENTS

| | | |
|---|---|---|
| 2,051,373 | Fitzgerald | Aug. 18, 1936 |
| 2,219,054 | Palm | Oct. 22, 1940 |
| 2,322,771 | Palm | June 29, 1943 |
| 2,324,083 | Holmes | July 13, 1943 |
| 2,362,566 | Lappert | Nov. 14, 1944 |
| 2,720,119 | Sherman | Oct. 11, 1955 |
| 2,762,116 | Rudner | Sept. 11, 1956 |
| 2,777,783 | Welch | Jan. 15, 1957 |
| 2,804,886 | White | Sept. 3, 1957 |
| 2,809,130 | Rappaport | Oct. 8, 1957 |
| 2,815,253 | Spriggs | Dec. 3, 1957 |
| 2,823,962 | Leonard | Feb. 18, 1958 |
| 2,865,691 | Muller | Dec. 23, 1958 |
| 2,906,552 | White | Sept. 29, 1959 |
| 2,907,612 | White | Oct. 6, 1959 |
| 2,976,093 | Reiling | Mar. 21, 1961 |
| 2,985,494 | Terhorst | May 23, 1961 |

FOREIGN PATENTS

| | | |
|---|---|---|
| 657,080 | Great Britain | Sept. 12, 1951 |
| 731,348 | Great Britain | June 8, 1955 |